United States Patent
Mizutani et al.

(10) Patent No.: US 11,365,326 B2
(45) Date of Patent: Jun. 21, 2022

(54) THERMOSETTING COMPOSITION, PAINT FINISHING METHOD AND METHOD FOR PRODUCING A PAINTED ARTICLE

(71) Applicant: Akzo Nobel Coatings International B.V., Arnhem (NL)

(72) Inventors: Hiroki Mizutani, Yokohama (JP); Takahiro Tsujita, Yokohama (JP); Taichiro Kohashi, Yokohama (JP); Nobuhiro Nishida, Yokohama (JP); Koji Miyabe, Yokohama (JP)

(73) Assignee: Akzo Nobel Coatings International B.V.

( * ) Notice: Subject to any disclaimer, the term of this patent is extended or adjusted under 35 U.S.C. 154(b) by 245 days.

(21) Appl. No.: 16/329,086

(22) PCT Filed: Sep. 4, 2017

(86) PCT No.: PCT/IB2017/001384
§ 371 (c)(1),
(2) Date: Feb. 27, 2019

(87) PCT Pub. No.: WO2018/047014
PCT Pub. Date: Mar. 15, 2018

(65) Prior Publication Data
US 2019/0225833 A1 Jul. 25, 2019

(30) Foreign Application Priority Data
Sep. 6, 2016 (JP) .............................. JP2016-173358

(51) Int. Cl.
C09D 175/06 (2006.01)
C08G 18/80 (2006.01)
C08G 18/22 (2006.01)
C08G 18/42 (2006.01)
C09D 7/63 (2018.01)
(Continued)

(52) U.S. Cl.
CPC .......... *C09D 175/06* (2013.01); *C08G 18/227* (2013.01); *C08G 18/4213* (2013.01); *C08G 18/4216* (2013.01); *C08G 18/807* (2013.01); *C08G 18/8074* (2013.01); *C08G 18/8077* (2013.01); *C08K 5/5419* (2013.01); *C09D 7/63* (2018.01); *C09D 167/00* (2013.01)

(58) Field of Classification Search
CPC ........ C08G 18/42–4297; C08G 18/227; C08K 5/5419; C09D 175/06
See application file for complete search history.

(56) References Cited

U.S. PATENT DOCUMENTS

| | | | |
|---|---|---|---|
| 5,780,530 A * | 7/1998 | Mizutani | C08G 18/837 427/387 |
| 2002/0025442 A1* | 2/2002 | Chang | D06M 13/513 428/447 |
| 2010/0190910 A1 | 7/2010 | Kohashi et al. | |

(Continued)

FOREIGN PATENT DOCUMENTS

| CN | 104497830 A | 4/2015 |
|---|---|---|
| CN | 104540911 A | 4/2015 |

(Continued)

OTHER PUBLICATIONS

Machine Translation of JP2000-143987A. May 26, 2000. (Year: 2000).*

(Continued)

*Primary Examiner* — Stephen E Rieth
(74) *Attorney, Agent, or Firm* — McDonnell Boehnen Hulbert & Berghoff LLP

(57) ABSTRACT

The present invention relates to a thermosetting composition characterized in that it contains (A) a polyester resin of number average molecular weight 1,000-10,000, hydroxyl value 5-200 mg KOH/g and, (B) 0.5-2.0 equivalents relative to the hydroxyl groups of the aforesaid component (A) of a compound (B) which is a blocked aliphatic isocyanate compound having reactivity with the hydroxyl groups of component (A), wherein the blocking is with methyl ethyl ketoxime and/or ε-caprolactam, (C) 0.05-5 parts by weight of a bismuth compound, per 100 parts by weight of total resin solids of component (A) and component (B), and (D) 0.5-50 parts by weight of an organosilicate represented by the following general formula (I) and/or a condensation product thereof, relative to 100 parts by weight of total resin solids of component (A) and component (B) wherein $R^1$, $R^2$, $R^3$ and $R^4$ in the formula each mean hydrogen atom or 1-10 carbon organic group, and can be the same or different, n is 1. By using the thermosetting, not only does stain resistance appear a short time after painting, but also excellent stain resistance is maintained for a long period, which fulfil the paint film performance requirements for painted steel sheet such as water resistance and bending workability and which have high environmental protection qualities and safety.

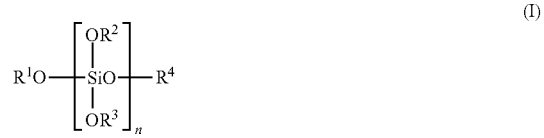

(I)

16 Claims, No Drawings

(51) Int. Cl.
    *C09D 167/00*     (2006.01)
    *C08K 5/5419*     (2006.01)

(56) References Cited

U.S. PATENT DOCUMENTS

| | | | |
|---|---|---|---|
| 2012/0252959 A1* | 10/2012 | Trindade | C08G 18/10 |
| | | | 524/507 |
| 2013/0150534 A1 | 6/2013 | Brinkman et al. | |
| 2015/0307737 A1 | 10/2015 | Mizutani et al. | |
| 2016/0075918 A1 | 3/2016 | Bogershausen et al. | |

FOREIGN PATENT DOCUMENTS

| | | | | |
|---|---|---|---|---|
| JP | H3-181575 A | | 8/1991 | |
| JP | 2000143987 A | * | 5/2000 | |
| JP | 2010-008035 A | | 1/2010 | |
| JP | 2016-130292 A | | 7/2016 | |
| TW | 201329123 A | | 7/2013 | |
| WO | WO-2012063756 A1 | * | 5/2012 | ........... C09D 175/06 |
| WO | 2014/199653 A1 | | 12/2014 | |
| WO | 2015/111709 A1 | | 7/2015 | |

OTHER PUBLICATIONS

Machine Translation of WO2012/063756 A1. May 18, 2012. (Year: 2012).*

Machine Translation of CN104497830A. Apr. 8, 2015. (Year: 2015).*

* cited by examiner

THERMOSETTING COMPOSITION, PAINT FINISHING METHOD AND METHOD FOR PRODUCING A PAINTED ARTICLE

This application is the US national phase under 35 U.S.C. § 371 of international application PCT/IB2017/001384, filed Sep. 4, 2017, which claims priority to Japanese application 2016-173358, filed Sep. 6, 2016.

FIELD OF THE INVENTION

The present invention relates to various fields, in particular to a thermosetting composition which can be used as a topcoat paint in the production of painted steel sheet, and in particular to a thermosetting composition which provides a paint film of excellent workability and excellent stain resistance, without forming harmful substances such as formaldehyde, and to a paint finishing method using this, and to a method for producing that painted article.

Further, the present invention relates to a paint finishing method with which continuous painting is possible with a roller coater used as a suitable production method for large volume production of painted steel sheet and to a method for producing a painted article.

BACKGROUND

Since the surfaces of painted steel sheet with applications such as building components (for example, shutters, storm doors, doors, roof materials or siding materials) and outdoor materials (for example air conditioner external units) are easily soiled by the effects of rain (acid rain), sandstorms and the like, excellent stain resistance is required. Also, in order to impart stain resistance to painted steel sheet, thermosetting compositions are required whereby paint films can be obtained with which not only does stain resistance appear within a short time after painting, but also the stain resistance is maintained for a long period.

Further, on painted steel sheet for indoor use, thermosetting compositions are required whereby paint films can be obtained with which workability and stain resistance can coexist, and with which harmful substances such as formaldehyde which are thought to cause sick house disease and the like are not formed. Moreover, in terms of its high productivity and with regard to production costs, painting in a paint line using roller coaters has become the most common painting method for painted steel sheet.

As such a paint composition with excellent stain resistance, in patent reference 1 a top-coat paint composition is disclosed which contains, relative to a resin binder containing (A) a specific hydroxyl group-containing paint film-forming resin and (B) an amino resin crosslinker, (C) an organosilicate and/or a condensation product thereof, (D) a boric acid compound, (E) untreated silica microparticles with oil absorbance of 100-280 ml/100 g and (F) titanium dioxide pigment of dry basis water content 20-30 ml/100 g, and this principle is disclosed that this top-coat paint composition can form paint films with excellent stain resistance towards rain and the like initially and in the course of time. However, with the paint composition of patent reference 1, formaldehyde was formed, and the workability was also not satisfactory.

Further, in patent reference 2, a paint composition is proposed which contains (A) a specific hydroxyl group-containing polyester resin of number average molecular weight 1,000-100,000 of at least one type selected from a polyester resin, silicone-modified polyester resin and fluorinated polyol resin, (B) at least one type selected from a (block) polyisocyanate, melamine resin and 1,3,5-triazine-2,4,6-tris-carbamate ester and oligomers thereof, (C) an inorganic oxide sol of at least one type selected from aluminum oxide sol, silicon oxide sol and the like, and (D) a silicone compound obtained by condensation polymerization of an (organo)silicate, a partial hydrolytic condensation product thereof and a silane coupling agent, and the principle is disclosed that this paint composition has excellent appearance, excellent initial stain resistance, long-term stain resistance, stain removal properties and the like, and high environmental protection qualities and safety. However, with the paint composition of patent reference 2, if painting is performed by roller coater, which because of its high productivity has become the most common painting method for painted steel sheet, there were problems since in a short time a decrease in gloss and a decrease in hydrophilicity and antistain performance occurs, it had defects in that stable production was impossible, and for productivity and painting cost reasons it has not come into practical use.

SUMMARY OF THE INVENTION

Problem to be Solved by the Invention

The present invention provides a thermosetting composition whereby a paint film can be obtained which manifests the paint film performance required for painted steel sheets, such as that not only does stain resistance appear a short time after painting, but also excellent stain resistance is maintained over a long period and water resistance and bending workability, and high environmental protection qualities and safety. Further, a purpose of the present invention is also to provide a thermosetting composition with which continuous painting is possible with a roller coater, which is used as the ideal production method for mass production of painted steel sheet.

Means of Solving Problem

The present inventors, as a result of repeated and diligent researches, discovered that the aforesaid problem can be solved by combination of a specific polyester resin, blocked aliphatic isocyanate compound, curing catalyst and organosilicate, and thus achieved the present invention.

That is to say, the present invention relates to a thermosetting composition characterized in that it contains (A) a polyester resin of number average molecular weight 1,000-10,000, hydroxyl value 5-200 mg KOH/g and, (B) 0.5-2.0 equivalents relative to the hydroxyl groups of the aforesaid component (A) of a compound (B) which is a blocked aliphatic isocyanate compound having reactivity with the hydroxyl groups of component (A), wherein the blocking is with methyl ethyl ketoxime (referred to below as MEK oxime) and/or ε-caprolactam, (C) 0.05-5 parts by weight of a bismuth compound, per 100 parts by weight of total resin solids of component (A) and component (B), and (D) 0.5-50 parts by weight of an organosilicate represented by the following general formula (I) and/or a condensation product thereof, relative to 100 parts by weight of total resin solids of component (A) and component (B)

(I)

wherein $R^1$, $R^2$, $R^3$ and $R^4$ in the formula each mean hydrogen atom or 1-10 carbon organic group, and can be the same or different, n is 1.

Further, among the aforesaid thermosetting compositions the present invention relates to a thermosetting composition characterized in that it contains 1-50 parts by weight, per 100 parts by weight of total resin solids of component (A) and component (B), of a compound (E) represented by the following general formula (II)

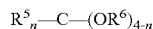

$$R^5{}_n\text{—C—}(OR^6)_{4-n}$$

wherein $R^5$ in the formula represents a hydrogen atom or a 1-10 carbon organic group, $R^6$ is a 1-10 carbon organic group, if there is a plurality of $R^5$ and/or $R^6$ these can be the same or different, and n is 1 or 2.

Further, the present invention relates to a method for paint finishing a metal sheet, characterized in that any of the aforesaid thermosetting compositions is applied onto a metal sheet, and thermally cured.

Further, the present invention relates to a method for paint finishing a metal sheet, characterized in that an undercoat paint is applied onto the metal sheet and thermally cured, as necessary a midcoat paint is then applied on top of that undercoat layer and thermally cured, and after this any of the aforesaid thermosetting compositions is applied on top of the paint layer(s) as a topcoat paint and thermally cured.

Further, the present invention relates to a method for paint finishing, characterized in that a roller coater is used as the paint machine.

Further, the present invention relates to the aforesaid method for paint finishing, wherein the aforesaid metal sheet is any of: cold rolled steel sheet, galvanized steel sheet, aluminum-zinc plated steel sheet, zinc-magnesium-plated steel sheet, aluminum-zinc-magnesium-plated steel sheet, stainless steel sheet, aluminum sheet and aluminum alloy sheet.

Moreover, the present invention relates to a method for the production of painted articles characterized in that they are formed by an aforesaid paint finishing method.

Effect of the Invention

The thermosetting compositions of the present invention have excellent environmental protection qualities and safety, further, by means of these thermosetting compositions, paint films can be obtained wherein not only does the stain resistance appear a short time after painting, but excellent stain resistance is maintained for a long period, and which fulfil the paint film performance requirements for painted steel sheet such as water resistance and bending workability. Also, with the thermosetting resins of the present invention, continuous painting on a paint line using a roller coater, which is the most common method for painting steel sheet on account of high productivity and in terms of production costs, is possible.

EMBODIMENTS OF THE INVENTION

The present invention is explained in concrete terms below, but the present invention is not limited to these specific, concrete examples.

In the thermosetting composition of the present invention, the polyester resin used as component (A) can be obtained by known methods using an esterification reaction with a polybasic acid and a polyhydric alcohol as the starting materials.

As polybasic acids, polycarboxylic acids are normally used, but if necessary monobasic fatty acids may be used at the same time. As polycarboxylic acids, for example phthalic acid, isophthalic acid, terephthalic acid, tetrahydrophthalic acid, tetrahydroisophthalic acid, hexahydrophthalic acid, hexahydroterephthalic acid, trimellitic acid, adipic acid, sebacic acid, succinic acid, azelaic acid, fumaric acid, maleic acid, itaconic acid, pyromellitic acid and anhydrides thereof and the like are mentioned. As monobasic fatty acids, for example, ricinoleic acid, oleic acid, linolic acid, palmitic acid, stearic acid and the like are mentioned. These polybasic acids and monobasic fatty acids can be used alone, and combinations of two or more can also be used.

As polyhydric alcohols, glycols and trihydric and higher polyhydric alcohols are mentioned. As glycols, for example, ethylene glycol, propylene glycol, diethylene glycol, triethylene glycol, tetraethylene glycol, dipropylene glycol, polyethylene glycol, polypropylene glycol, neopentyl glycol, hexylene glycol, 1,3-butanediol, 1,4-butanediol, 1,5-pentanediol, 1,6-hexanediol, 2-butyl-2-ethyl-1,3-propanediol, methyl-propanediol, cyclohexanedimethanol, 3,3-diethyl-1,5-pentanediol and the like are mentioned. Further, as trihydric and higher polyhydric alcohols, for example, glycerin, trimethylolethane, trimethylolpropane, pentaerythritol, dipentaerythritol and the like are mentioned. These polyhydric alcohols can be used singly, and combinations of two or more can also be used.

With regard to bending workability and stain resistance, the number average molecular weight of component (A) is preferably 1,000-10,000, more preferably 1,200-9,000 and especially preferably 1,500-6,000. In the present invention, the number average molecular weight is the value of the number average molecular weight measured by gel permeation chromatography (GPC) when calculated using the number average molecular weight of polystyrene as the standard. Specifically, this number average molecular weight is for example 1,000, 1,500, 2,000, 2,500, 3,000, 3,500, 4,000, 4,500, 5,000, 5,500, 6,000, 6,500, 7,000, 7,500, 8,000, 8,500, 9,000, 9,500 or 10,000, and can also be in the range between any two of the numerical values shown here by way of example. If the number average molecular weight of component (A) is less than 1,000, the bending workability may decrease. Also, if it is greater than 10,000, the stain resistance may decrease.

The hydroxyl value of component (A), in order for the stain resistance to appear a short time after painting, is preferably 5-200 mg KOH/g, more preferably 10-190 mg KOH/g and especially preferably 14-180 mg KOH/g. Specifically, this hydroxyl value is for example 5, 10, 15, 20, 30, 40, 50, 60, 70, 80, 90, 100, 120, 130, 140, 150, 160, 170, 180, 190 or 200, and can also be in the range between any two of the numerical values shown here by way of example. If the hydroxyl value is less than 5 mg KOH/g, the stain resistance may decrease. Also, if the hydroxyl value is greater than 200 mg KOH/g, the bending workability may decrease.

There is no particular restriction as to the acid value of component (A), and for example 2-50 mg KOH/g is preferable. Further, as component (A) a polyester resin can be used alone, and a combination of two or more types can also be used.

Component (B) of the thermosetting composition of the present invention is a crosslinking agent which reacts with hydroxyl groups. As the crosslinking agent (B) which reacts with hydroxyl groups, in terms of bending workability, versatility, and safety and environmental safety of the paint composition, a blocked aliphatic polyisocyanate compound is especially preferable.

As blocked aliphatic polyisocyanate compounds, those wherein the isocyanate groups of the polyisocyanate compound are blocked for example with alcohols such as butanol, oximes such as methyl ethyl ketone oxime, lactams such as ε-caprolactam, diketones such as acetylacetone, keto esters such as acetoacetate esters, dicarboxylate esters such as diethyl malonate, imidazoles such as imidazole or 2-ethylimidazole, pyrazoles such as 3-methylpyrazole or dimethylpyrazole, or phenols such as m-cresol are mentioned, but in terms of maintenance of gloss stability and stain resistance functions when applied continuously with a roller coater which are characteristics of the present invention and further, ensuring paint viscosity stability, and accommodating the short stoving time, blocked polyisocyanate compounds blocked with methyl ethyl ketone oxime and/or ε-caprolactam are especially preferable.

As polyisocyanate compounds, for example, aliphatic diisocyanates such as hexamethylene diisocyanate (HDI), trimethylhexamethylene diisocyanate and dimer acid diisocyanate, and aromatic diisocyanates such as xylylene diisocyanate (XDI), 1,4-phenylene diisocyanate, tolylene diisocyanate (TDI) and 4,4-diphenylmethane diisocyanate (MDI), and also alicyclic diisocyanates such as isophorone diisocyanate (IPDI), hydrogenated XDI, hydrogenated TDI and hydrogenated MDI, and adducts, biurets and isocyanurates thereof, and the like are mentioned, but in terms of the balance of processing and curing properties and weather resistance, aliphatic diisocyanate compounds and alicyclic diisocyanate compounds are especially preferable.

The component (B) blocked polyisocyanate compounds can be used singly, and combinations of two or more types can also be used.

In the thermosetting compositions of the present invention, as regards the compounding ratio of component (A) and component (B), it is necessary that the equivalent of blocked isocyanate groups in component (B) relative to the hydroxyl groups in component (A) (NCO/OH) be in the range 0.5-2.0, more preferably in range 0.7-1.5, and still more preferably in the range 0.8-1.3. This equivalent, in concrete terms, for example is 0.5, 0.6, 0.7, 0.8, 0.9, 1.0, 1.1, 1.2, 1.3, 1.4, 1.5, 1.6, 1.7, 1.8, 1.9 or 2.0, and can also be in the range between any two of the numerical values shown here by way of example. If said equivalent is less than 0.5, since the hydroxyl groups of component (A) remain present in excess during the curing reaction of the thermosetting composition, the paint film water resistance is impaired, which is undesirable. On the other hand, if said equivalent exceeds 2.0 equivalents, since blocked isocyanate groups and/or liberated/regenerated isocyanate groups of component (B) remain present, again the paint film water resistance is impaired, which is undesirable.

The component (C) of the thermosetting composition of the present invention is a catalyst for the curing reaction of the polyester resin which is component (A) and the blocked aliphatic polyisocyanate compound which is component (B). As the curing reaction catalyst, for example metal compounds such as tin compounds or zinc compounds, zirconium compounds, aluminum compounds and bismuth compounds or amines and the like are mentioned, but in terms of maintenance of the gloss stability and stain resistance functions when applied continuously with a roller coater which are characteristics of the present invention, the component (C) of the present invention is especially preferably a bismuth compound.

As examples of bismuth compounds which are component (C) of the thermosetting compositions of the present invention, bismuth tris(acetate), bismuth tris-(butyrate), bismuth tris(2-ethylhexanoate), bismuth tris(octoate), bismuth tris(laurate), bismuth tris-(stearate), bismuth tris(isostearate), bismuth tris-(oleoylsarcosinate), Neostan U-600 (Nitto Kasei Corp. brand name), K-KAT 348, K-KAT XK-640, K-KAT XK-628, K-KAT XC-227 (all King Industries Corp. brand names) and the like are mentioned.

The component (C) bismuth compounds can be used alone and combinations of 2 or more can also be used.

When a bismuth compound (C) is used as component (C) of the thermosetting compositions of the present invention, the content of the component (C) is preferably 0.05-5 parts by weight, per 100 parts by weight of total resin solids of component (A) and component (B). More preferably it is 0.07-4 parts by weight, and especially preferably 0.1-3 parts by weight. This value (parts by weight), in concrete terms for example is 0.05, 0.06, 0.07, 0.08, 0.09, 0.10, 0.11, 0.15, 0.20, 0.25, 0.30, 0.35, 0.40, 0.45, 0.50, 0.55, 0.60, 0.65, 0.70, 0.75, 0.80, 0.85, 0.90, 0.95, 1.1, 1.2, 1.3, 1.4, 1.5, 1.6, 1.7, 1.8, 1.9, 2.0, 2.5, 3.0, 3.5, 4.0, 4.5 or 5, and can also be in the range between any two of the numerical values shown here by way of example. If the content of component (C) is less than 0.05 parts by weight relative to 100 parts by weight of total resin solids of component (A) and component (B), the stain resistance may decrease. Further, if it is greater than 5 parts by weight, the maintenance of the gloss stability and stain resistance functions when applied continuously with a roller coater which are characteristics of the present invention may decrease.

Component (D) of the thermosetting composition of the present invention is an organosilicate represented by the following general formula (I) and/or a condensation product thereof:

(I)

wherein $R^1$, $R^2$, $R^3$ and $R^4$ in the formula each mean hydrogen atom or 1-10 carbon organic group, and can be the same or different, n is 1.

Examples of organosilicates represented by the aforesaid general formula (I) are one or more tetra-alkoxysilanes selected from tetramethoxysilane, tetra-ethoxysilane, tetrapropoxysilane, tetraisopropoxy-silane, tetrabutoxysilane and tetraisobutoxysilane. As condensation products of organosilicates, condensation products and/or partial hydrolytic condensation products of the aforesaid silanes singly or combinations of two or more of the aforesaid silanes and the like are mentioned.

The organosilicate condensation products or hydrolysis products can be produced by normal methods, but as commercial products, for example MKC silicates MS51, MS56, MS56S, MS57, MS56SB5, MS58615, MS58630, ES40, EMS31 and BTS (all Mitsubishi Chemical (Corp.) brand names), methyl silicate 51, ethyl silicate 40, ethyl silicate 40T, ethyl silicate 48 and EMS-485 (all Colcoat (Corp.) brand names) can be used singly or as combinations of two or more. As organosilicate partial hydrolytic condensation products, 2-20-mers are preferable. In the paint compositions of the present invention, one component (D) organosilicate and/or condensation product thereof, can be used, or a combination of two or more, can also be used.

The content of the component (D) in the thermosetting compositions of the present invention is preferably 0.5-50 parts by weight per 100 parts by weight of total resin solids of component (A) and component (B). More preferably, it is 0.7-20 parts by weight. Especially preferably, it is 1.0-10 parts by weight. This value (parts by weight) in concrete terms is for example 0.5, 0.6, 0.7, 0.8, 0.9, 1, 2, 3, 4, 5, 6, 7, 8, 9, 10, 15, 20, 25, 30, 35, 40, 45 or 50, and can also be in the range between any two of the numerical values shown here by way of example. If the content of component (D) is less than 0.5 parts by weight per 100 parts by weight of total resin solids of component (A) and component (B), the stain resistance may decrease. Also, if it is greater than 50 parts by weight, the bending workability may decrease.

Components (D) such as the aforesaid migrate to the surface of the thermosetting composition paint film, and on the surface expose hydrophilic groups by degradation of the alkoxy groups, thus increasing the hydrophilicity of the paint film surface and improving the stain resistance. On the other hand, with the component (D), hydrolysis due to catalyst and water and also condensation reactions can easily proceed violently, and if the hydrolysis and condensation reactions progress before complete curing of the thermosetting composition, hydrophilic groups may disappear, or migration to the paint surface be impeded, so that the hydrophilicity of the paint film worsens, also, compatibility within the paint may decrease, and cause clouding or impairment of the paint film gloss.

In the present invention, with the use of a specified quantity of bismuth compound (C) as the catalyst for components (A) and (B), compared to when previous catalysts (tin systems, zirconium systems and the like) were used, the reactions of component (D) are moderately suppressed, and balance in the curing reactions of the whole is obtained. As a result, not only the appearance of the paint film, but also its stain resistance and its mechanical strength improve.

In order to control the aforesaid curing reactions more effectively, the thermosetting compositions of the present invention can preferably contain a compound (E) represented by the following general formula (II):

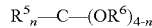

$R^5{}_n$—C—$(OR^6)_{4-n}$ wherein $R^5$ in the formula represents a hydrogen atom or a 1-10 carbon organic group, $R^6$ is a 1-10 carbon organic group, if there is a plurality of $R^5$ and/or $R^6$ these can be the same or different, and n is 1 or 2.

As examples of the compound (E) represented by the general formula (II), trimethyl orthoformate, triethyl orthoformate, tri(n-propyl) orthoformate, trimethyl orthoacetate, triethyl orthoacetate, tributyl ortho-acetate trimethyl orthobutyrate, triethyl orthobutyrate, trimethyl orthopropionate, triethyl orthopropionate, trimethyl orthovalerate, triethyl orthovalerate, 2,2-dimethoxypropane, 2,2-diethoxypropane, 3,3-dimethoxy-hexane, 2,2-dibutoxypropane and the like are mentioned.

The content of the component (E) in the thermosetting compositions of the present invention is preferably 0.5-50 parts by weight per 100 parts by weight of total resin solids of component (A) and component (B). More preferably, it is 0.5-20 parts by weight. Especially preferably, it is 0.5-10 parts by weight. This value (parts by weight) in concrete terms is for example 0.5, 0.6, 0.7, 0.8, 0.9, 1, 2, 3, 4, 5, 6, 7, 8, 9, 10, 15, 20, 25, 30, 35, 40, 45 or 50, and can also be in the range between any two of the numerical values shown here by way of example. If the content of component (E) is less than 0.5 parts by weight per 100 parts by weight of total resin solids of component (A) and component (B), the functions of gloss stability and stain resistance on continuous application with a roller coater which are characteristics of the present invention may decline. Also, if it is greater than 50 parts by weight, the paint viscosity decreases and the paint processability may decline.

Thus in the present invention, by using components (C) and (D) in the specified proportions, and more preferably also using component (E) in the specified proportion, relative to components (A) and (B), not only the curing reaction of components (A) and (B), but also the condensation reactions of component (D) are suitably regulated, and balance of the reactions as a whole can be obtained. Consequently, the thermosetting compositions of the present invention are particularly suitable for topcoat layers (layers exposed on surface) where not only mechanical strength, but also hydrophilicity, appearance and the like are considered important.

As necessary, in addition to the aforesaid, various known components commonly used in the paints sector can be incorporated into the thermosetting compositions of the present invention. In concrete terms, for example, various surface modifiers such as levelling agents and antifoam agents, various additives such as dispersants, antisettling agents, UV absorbers, light stabilizers and antiscratch agents, various pigments such as color pigments and extender pigments, glitter materials, organic solvents and the like are mentioned.

The thermosetting compositions of the present invention can be either organic solvent type thermosetting compositions mainly diluted with organic is solvent or aqueous thermosetting compositions mainly diluted with water, but are preferably organic solvent type thermosetting compositions. The organic solvent is for example an ester solvent such as n-butyl acetate, isobutyl acetate, n-pentyl acetate or 3-methoxybutyl acetate, a ketone solvent such as methyl isobutyl ketone, cyclohexanone or isophorone, an aromatic solvent such as Solvesso 100 or Solvesso 150 (the above are brand names, Exxon Mobil Chemical Corp.) or the like. These organic solvents can be used singly or as mixtures of two or more.

The thermosetting compositions of the present invention can be stored and transported as one-pack compositions wherein components (A)-(D) and optionally component (E) are mixed, but preferably they are in multi-pack form, wherein component (D) is a separate agent, at least separated from component (C) and more preferably separated from components (A)-(C), and are made into the compositions containing components (A)-(D) and optionally component (E) by mixing immediately before use. Component (E) can be mixed with component (D), but components (A)-(C) and component (E) are preferably mixed beforehand.

As a painting method appropriate when the thermosetting compositions of the present invention are used, methods wherein, after regulating the thermosetting composition to the desired viscosity as necessary by warming, or adding an organic solvent or reactive diluent, it is normally applied such that the paint film thickness after drying is 0.5-300 μm using a normally used paint machine such as an air spray, electrostatic air spray, roller coater, flow coater, or dipping system, or using a paint-brush, bar coater, applicator or the like, and normally cured at temperature 50-300° C. over 5 seconds to 24 hours are mentioned, but methods wherein it is applied using a roller coater, and cured under the drying conditions 10-120 seconds with a maximum attained sheet temperature of the material (metal sheet) of 120-260° C. are suitable.

Further, metal sheet can be finished using the thermosetting compositions of the present invention. As a method for finishing metal sheet, the thermosetting composition of the present invention can be applied directly onto the metal sheet, but preferably methods are mentioned characterized in that an undercoat paint is applied onto the metal sheet and thermally cured, as necessary a midcoat paint is further applied on top of that undercoat paint film and thermally cured, and after that any of the aforesaid thermosetting compositions is applied onto the paint film layer as a topcoat paint and thermally cured. By means of this method, the cured product from the thermosetting composition of the present invention is exposed on the painted article surface after painting.

Here, "curing" means hardening by drying or hardening by means of crosslinking agent(s). Also, in topcoat paints made up of the thermosetting composition of the present invention, 0-300 parts by weight of one or more pigments can be incorporated per 100 parts by weight total solids content of component (A) and component (B). The quantity of pigment incorporated is preferably in particular 0-100 parts by weight. Also, if a pigment is incorporated, preferably at least 0.1 parts by weight are incorporated. As the pigment, various pigments such as organic pigments and inorganic pigments can be used, and for example metal pigments such as aluminum, copper, brass, bronze, stainless steel, each surface-treated, or micaceous iron oxide, flaky metallic powder, mica flakes coated with titanium oxide or iron oxide, and the like are used. Further, apart from these, heat-protecting (infrared-reflecting) pigments utilizing inorganic pigments such as titanium dioxide, iron oxide, yellow iron oxide and carbon black, inorganic composite oxides, perylene black and black interference aluminum, organic pigments such as phthalocyanine blue, phthalocyanine green and quinacridone red pigments, and extender pigments such as precipitated barium sulfate, clay, silica and talc, and the like are mentioned.

As the undercoat paint and midcoat paint, paints used as normal undercoat paints and midcoat paints can be used. As concrete examples of preferable undercoat paints and midcoat paints, epoxy paints, polyester paints and polyester urethane paints are mentioned, and as commercial products, Precolor Primer HP32 and Precolor Primer CF703, which are epoxy paints, the polyester paint Precolor Primer FX31, Coiltec U HP300 and Polyceram U HD6000, which are polyester urethane paints (all BASF Japan (Corp.), brand names) and the like are mentioned. As regards the painting methods for the undercoat paints, midcoat paints and topcoat paints, this can be performed by various painting methods, but painting methods by means of roller coaters, flow coaters or sprays and the like are preferable. Among these, as a painting method for painted steel sheet, the painting method by means of a roller coater, with which continuous painting at high speed in a paint line is possible, is most suitable in terms of productivity and cost.

When topcoat paint is applied by means of a roller coater, natural systems and reverse systems can be considered, but with regard to the smoothness of the paint surface, reverse systems are preferable.

The paint films applied with the undercoat paint, midcoat paint and topcoat paint are cured each time in order of painting, and this curing is normally best effected under the curing conditions 100-300° C., 5 seconds to 5 minutes, and for example in the precoat paint field wherein painting is by means of coil coating or the like, curing is normally best effected with a maximum material attained temperature of 120-260° C., for 10 to 120 secs. The thickness of the undercoat paint film is preferably 0.5-60 µm, the thickness of the midcoat paint film is preferably 0.5-60 µm, and the thickness of the topcoat paint film is preferably 0.5-100 µm.

As the metal sheet, various metal sheets can be used, and for example cold rolled steel sheet, zinc plated steel sheet such as galvanized steel sheet, aluminum-zinc plated steel sheet, zinc-magnesium-plated steel sheet, aluminum-zinc-magnesium-plated steel sheet, fused zinc steel sheet (non-alloyed)/zinc iron sheet, fused zinc-plated steel sheet (alloyed) and fused zinc-aluminum alloy-plated steel sheet, stainless steel sheet, aluminum sheet, aluminum alloy sheet, and the like are mentioned.

When the undercoat paint is applied onto the metal sheet, a treatment is preferably performed on the surface of the metal sheet before painting, and as this painting pretreatment any passivation used as precoat metal pretreatment can be used, for example chromate passivation, chromate-free passivation, phosphate salt passivation, composite oxide film treatment and the like are mentioned.

EXAMPLES

Below, the present invention is explained in more detail by giving practical examples, but the present invention is not limited to these. Also, unless especially stated, parts, % and ratio in each example respectively represent parts by weight, weight % and weight ratio.

Production Example: Production of Polyester Resin Solutions Pe-1 to 13

The monomers shown in Table 1 were placed in a flask fitted with thermometer, Dean-Stark tube, reflux condenser, nitrogen feed tube and stirrer, gradually heated to 240° C. with stirring, a reflux solvent (xylene) was introduced and a dehydrative condensation polymerization reaction performed. When the acid value reached the values shown in Table 1, the mixture was diluted by adding a mixed solvent (aromatic solvent (brand name "Solvesso 100", Exxon Mobile Chemical Corp.)/cyclohexanone=50/50 (weight ratio) such that the solids content was 50%. As a result, the hydroxyl group-containing polyester resin solutions P-1 to 13 with solid fractions having the properties shown in Table 1 were obtained as components (A).

TABLE 1

| 1. Polyester resin production examples | | | | | | | | | | |
|---|---|---|---|---|---|---|---|---|---|---|
| | | | | 2. polyester resin solutions | | | | | | |
| | | | | PE-1 | PE-2 | PE-3 | PE-4 | PE-5 | PE-6 | PE-7 |
| 3. monomer (parts by weight) | 4. polybasic carboxylic acid | isophthalic acid | a | 22.5 | 22.5 | 22.5 | 22.5 | 22.5 | 22.5 | 22.5 |
| | | phthalic anhydride | b | 14.8 | 14.8 | 14.8 | 14.8 | 14.8 | 14.8 | 14.8 |
| | | adipic acid | c | 19.43 | 18.66 | 18.88 | 19.3 | 19.43 | 19.97 | 19.45 |

TABLE 1-continued

1. Polyester resin production examples

| 5. polyhydric alcohol | neopentyl glycol | a | 23.6 | 32.3 | 29.8 | 21.6 | 20.2 | 41.5 | 19.5 |
|---|---|---|---|---|---|---|---|---|---|
| | 1,6-hexanediol | b | 8.5 | 8.5 | 8.5 | 8.5 | 8.5 | 1.1 | 8.5 |
| | trimethylolpropane | c | 11.17 | 3.24 | 5.52 | 13.3 | 14.57 | 0.13 | 15.25 |
| 6. acid value | | | 10 | 10 | 10 | 3 | 3 | 43 | 2 |
| 7. solid fraction ratio (%) | | | 50% | 50% | 50% | 50% | 50% | 50% | 50% |
| 8. solid fraction properties | number average molecular weight | a | 3,000 | 1,600 | 1,750 | 5,500 | 8,000 | 800 | 11,000 |
| | hydroxyl value (mgKOH/g) | b | 80 | 80 | 80 | 80 | 80 | 80 | 80 |

| | | | 2. polyester resin solutions | | | | | |
|---|---|---|---|---|---|---|---|---|
| | | | PE-8 | PE-9 | PE-10 | PE-11 | PE-12 | PE-13 |
| 3. monomer (parts by weight) | 4. polybasic carboxylic acid | isophthalic acid | a | 24.5 | 23.5 | 22.5 | 22.5 | 26.5 | 22.5 |
| | | phthalic anhydride | b | 18.8 | 16.8 | 14.8 | 14.8 | 20.8 | 14.8 |
| | | adipic acid | c | 16.58 | 18.22 | 17.41 | 16.56 | 14.01 | 15.53 |
| | 5. polyhydric alcohol | neopentyl glycol | a | 34.1 | 30.5 | 13.8 | 10.2 | 35.5 | 6.3 |
| | | 1,6-hexanediol | b | 5.5 | 5.5 | 8.5 | 4.4 | 2.5 | 1.1 |
| | | trimethylolpropane | c | 0.52 | 5.48 | 22.99 | 31.54 | 0.69 | 39.77 |
| 6. acid value | | | 25 | 18 | 5 | 5 | 37 | 3 |
| 7. solid fraction ratio (%) | | | 50% | 50% | 50% | 50% | 50% | 50% |
| 8. solid fraction properties | number average molecular weight | a | 3,000 | 3,000 | 3,000 | 3,000 | 3,000 | 3,000 |
| | hydroxyl value (mgKOH/g) | b | 15 | 45 | 140 | 180 | 4 | 220 |

Production of Thermosetting Compositions PA-1 to PA-42

Among the components stated in the following Table 2, titanium dioxide and the components (A) were mixed, introduced into a ring mill and dispersed until the titanium dioxide particle size was 10 μm or less. After this, the respective components stated in Table 2 were added and mixed in to give the thermosetting compositions PA-1 to PA-42. The viscosities of the thermosetting compositions PA-1 to PA-42 obtained were adjusted to Ford Cup No. 4 80±10 secs with mixed solvent (aromatic solvent (brand name "Solvesso 100", Exxon Mobile Chemical Corp.)/cyclohexanone=50/50 (weight ratio).

TABLE 2

1. Table 2A: thermosetting composition production examples 1.

2. thermosetting composition

| | | PA-1 | PA-2 | PA-3 | PA-4 | PA-5 | PA-6 | PA-7 | PA-8 | PA-9 | PA-10 | PA-11 | PA-12 | PA-13 | PA-14 | PA-15 | PA-16 | PA-17 |
|---|---|---|---|---|---|---|---|---|---|---|---|---|---|---|---|---|---|---|
| 3. titanium dioxide | | 100.0 | 100.0 | 100.0 | 100.0 | 100.0 | 100.0 | 100.0 | 100.0 | 100.0 PE-1 | 100.0 | 100.0 | 100.0 | 100.0 | 100.0 | 100.0 | 100.0 | 100.0 |
| 4. A: polyester resin (calc. solids content) | | 71.2 | 79.1 | 77.1 | 62.2 | 52.2 | 89.2 | 45.4 | 70.0 | 66.7 | 71.2 | 79.1 | 71.2 | 71.2 | 67.5 | 70.3 | 70.3 | 71.2 |
| B: blocked isocyanate (calc. solids content) | B-1 | 28.8 | | | 37.8 | | 10.8 | | | | 28.8 | | 28.8 | 28.8 | | | | 28.8 |
| | B-2 | | 20.9 | | | 47.8 | | 54.6 | | | | 20.9 | | | 32.5 | | | |
| | B-3 | | | 22.9 | | | | | | | | | | | | 29.7 | 29.7 | |
| | B-4 | | | | | | | | 30.0 | | | | | | | | | |
| | B-5 | | | | | | | | | 33.3 | | | | | | | | |
| C: bismuth compound or other (calc. solids content) | C-1 | 0.5 | 0.5 | | | | 0.5 | | | | | | | 3.0 | | | | |
| | C-2 | | | 0.5 | | | | | | | | | | | | | | |
| | C-3 | | | | 0.5 | 0.5 | | 0.5 | 0.5 | 0.5 | | | | | 0.03 | 6.0 | | |
| | C-4 | | | | | | | | | | 0.5 | 0.5 | | | | | | |
| | C-5 | | | | | | | | | | | | 0.5 | | | | | |
| | C-6 | | | | | | | | | | | | | | | | 0.5 | |
| | C-7 | | | | | | | | | | | | | | | | | 0.5 |
| D: organosilicate | D-1 | 5.0 | | | 5.0 | | 5.0 | | | 5.0 | | | 5.0 | | | 5.0 | | |
| | D-2 | | 5.0 | | | 5.0 | | 5.0 | | | 5.0 | 5.0 | | 5.0 | | | | 5.0 |
| | D-3 | | | 5.0 | | | 5.0 | | 5.0 | | | | | | 5.0 | | | |
| E: compound (E) | E-1 | 5.0 | | | 5.0 | | 5.0 | | | 5.0 | | | 5.0 | | | 5.0 | | 5.0 |
| | E-2 | | 5.0 | | | 5.0 | | 5.0 | | | 5.0 | 5.0 | | | 5.0 | | | |
| | E-3 | | | 5.0 | | | 5.0 | | 5.0 | | | | 5.0 | | | 5.0 | 5.0 | |
| 5. equivalents of component (B) relative to hydroxyl groups of component (A). | | 1 | 0.55 | 0.7 | 1.5 | 1.9 | 0.3 | 2.5 | 1 | 1 | 1 | 0.55 | 1 | 1 | 1 | 1 | 1 | 1 |

TABLE 2-continued

Table 2B: thermosetting composition production examples 1.

| | | 2. thermosetting composition | | | | | | | | | | | | |
|---|---|---|---|---|---|---|---|---|---|---|---|---|---|
| | | PA-18 | PA-19 | PA-20 | PA-21 | PA-22 | PA-23 | PA-24 | PA-25 | PA-26 | PA-27 | PA-28 | PA-29 | PA-30 |
| 3. titanium dioxide | | 100.0 | 100.0 | 100.0 | 100.0 | 100.0 | 100.0 | 100.0 | 100.0 | 100.0 | 100.0 | 100.0 | 100.0 | 100.0 |
| A: polyester resin | | | | | | | | PE-1 | | | | | | |
| 4. (calc. solids content) | | 67.5 | 70.3 | 71.2 | 67.5 | 71.2 | 70.3 | 71.2 | 67.5 | 71.2 | 70.3 | 71.2 | 67.5 | 70.3 |
| B: blocked isocyanate (calc. solids content) | B-1 | | | 28.8 | | 28.8 | | 28.8 | | 28.8 | | 28.8 | | |
| | B-2 | 32.5 | | | 32.5 | | | | 32.5 | | | | 32.5 | |
| | B-3 | | 29.7 | | | | 29.7 | | | | 29.7 | | | 29.7 |
| | B-4 | | | | | | | | | | | | | |
| | B-5 | | | | | | | | | | | | | |
| C: bismuth compound or other (calc. solids content) | C-1 | 0.5 | | | | | 0.5 | | | | 0.5 | | | |
| | C-2 | | 0.5 | | | | | 0.5 | | | | 0.5 | | |
| | C-3 | | | 0.5 | | | | | 0.5 | | | | | 0.5 |
| | C-4 | | | | 0.5 | | | | | 0.5 | | | | |
| | C-5 | | | | | 0.5 | | | | | | 0.5 | | |
| | C-6 | | | | | | | | | | | | | |
| | C-7 | | | | | | | | | | | | | |
| D: organosilicate | D-1 | | 3.0 | | | | | 0.4 | | | 5.0 | | | 5.0 |
| | D-2 | | | 10.0 | | | | 55.0 | | 5.0 | | 5.0 | | |
| | D-3 | 1.0 | | | 20.0 | | | | 5.0 | | | | 5.0 | |
| E. compound (E) | E-1 | | | 5.0 | | 5.0 | | 5.0 | | 0.3 | | 2.0 | | |
| | E-2 | 5.0 | | | 5.0 | | | | | | | | 10.0 | |
| | E-3 | | 5.0 | | | | 5.0 | | | | 0.5 | | | 20.0 |
| 5. equivalents of component (B) relative to hydroxyl groups of component (A) | | 1 | 1 | 1 | 1 | 1 | 1 | 1 | 1 | 1 | 1 | 1 | 1 | 1 |
| 6. total resin solids content X of component (A) and component (B) | | 100.0 | 100.0 | 100.0 | 100.0 | 100.0 | 100.0 | 100.0 | 100.0 | 100.0 | 100.0 | 100.0 | 100.0 | 100.0 |
| 7. weight % of component (C) relative to total weight X | | 0.50 | 0.50 | 0.50 | 0.50 | 0.50 | 0.50 | 0.50 | 0.50 | 0.50 | 0.50 | 0.50 | 0.50 | 0.50 |
| 8. weight % of component (D) relative to total weight X | | 1.0 | 3.0 | 10.0 | 20.0 | 0.0 | 0.4 | 55.0 | 5.0 | 5.0 | 5.0 | 5.0 | 5.0 | 5.0 |
| 9. weight % of component (E) relative to total weight X | | 5.0 | 5.0 | 5.0 | 5.0 | 5.0 | 5.0 | 5.0 | 0.0 | 0.3 | 0.5 | 2.0 | 10.0 | 20.0 |

1. Table 2C thermosetting composition production examples;

| | | 2. thermosetting composition | | | | | | | | | | | |
|---|---|---|---|---|---|---|---|---|---|---|---|---|---|
| | | PA-31 | PA-32 | PA-33 | PA-34 | PA-35 | PA-36 | PA-37 | PA-38 | PA-39 | PA-40 | PA-41 | PA-42 |
| 3. titanium dioxide | | 100.0 | 100.0 | 100.0 | 100.0 | 100.0 | 100.0 | 100.0 | 100.0 | 100.0 | 100.0 | 100.0 | 100.0 |
| 4. A: polyester resin (calc. solids content) | | PE-2 | PE-3 | PE-4 | PE-5 | PE-6 | PE-7 | PE-8 | PE-9 | PE-10 | PE-11 | PE-12 | PE-13 |
| | | 70.3 | 71.2 | 87.5 | 70.3 | 71.2 | 67.5 | 92.7 | 81.4 | 54.2 | 51.2 | 98.0 | 43.1 |
| B: blocked isocyanate (calc. solids content) | B-1 | | 28.8 | | | 28.8 | | | 18.6 | | | 2.0 | |
| | B-2 | | | 32.5 | | | 32.5 | | | 45.8 | | | 56.9 |
| | B-3 | 29.7 | | | 29.7 | | | 7.3 | | | 48.8 | | |
| | B-4 | | | | | | | | | | | | |
| | B-5 | | | | | | | | | | | | |
| C: bismuth compound or other (calc. solids content) | C-1 | 0.5 | | | | | 0.5 | | | | | 0.5 | |
| | C-2 | | 0.5 | | | | | 0.5 | | | | | 0.5 |
| | C-3 | | | 0.5 | | | | | 0.5 | | | | |
| | C-4 | | | | 0.5 | | | | | 0.5 | | | |
| | C-5 | | | | | 0.5 | | | | | 0.5 | | |
| | C-6 | | | | | | | | | | | | |
| | C-7 | | | | | | | | | | | | |
| D: organosilicate | D-1 | 5.0 | | | 5.0 | | | 5.0 | | | 5.0 | | |
| | D-2 | | 5.0 | | | 5.0 | | | 5.0 | | | 5.0 | |
| | D-3 | | | 5.0 | | | 5.0 | | | 5.0 | | | 5.0 |
| E: compound (E) | E-1 | | 5.0 | | | 5.0 | | | 5.0 | | 5.0 | | |
| | E-2 | | | 5.0 | | | 5.0 | | | 5.0 | | 5.0 | |
| | E-3 | 5.0 | | | 5.0 | | | 5.0 | | | | | 5.0 |

TABLE 2-continued

| | | | | | | | | | | | | |
|---|---|---|---|---|---|---|---|---|---|---|---|---|
| 5. equivalents of component (B) relative to hydroxyl groups of component (A) | 1 | 1 | 1 | 1 | 1 | 1 | 1 | 1 | 1 | 1 | 1 | 1 |
| 6. total resin solids content X of component (A) and component (B) | 100.0 | 100.0 | 100.0 | 100.0 | 100.0 | 100.0 | 100.0 | 100.0 | 100.0 | 100.0 | 100.0 | 100.0 |
| 7. weight % of component (C) relative to total weight X | 0.50 | 0.50 | 0.50 | 0.50 | 0.50 | 0.50 | 0.50 | 0.50 | 0.50 | 0.50 | 0.50 | 0.50 |
| 8. weight % of component (D) relative to total weight X | 5.0 | 5.0 | 5.0 | 5.0 | 5.0 | 5.0 | 5.0 | 5.0 | 5.0 | 5.0 | 5.0 | 5.0 |
| 9. weight % of component (E) relative to total content X | 5.0 | 5.0 | 5.0 | 5.0 | 5.0 | 5.0 | 5.0 | 5.0 | 5.0 | 5.0 | 5.0 | 5.0 |

Here, the components used in Table 2 are as follows.

Component (B)

B-1: Desmodur BL3175 Sumika Bayer Urethane Corp., MEK oxime-blocked isocyanate, monomer type HDI, solids content 75%, NCO equivalents 378

B-2: Desmodur BL4265 Sumika Bayer Urethane Corp., MEK oxime-blocked isocyanate, monomer type IPDI, solids content 65%, NCO equivalents 519

B-3: Desmodur BL3272 Sumika Bayer Urethane Corp., ε-caprolactam-blocked isocyanate, monomer type HDI, solids content 72%, NCO equivalents 412

B-4: Desmodur BL3575/1 Sumika Bayer Urethane Corp., dimethylpyrazole-blocked isocyanate, monomer type HDI, solids content 75%, NCO equivalents 400

B-5: Product No. 7951 Baxenden Corp., dimethylpyrazole-blocked isocyanate, monomer type IPDI, solids content 65%, NCO equivalents 539.

Component (C)

C-1: Bismuth tris(2-ethylhexanoate) content 100 wt. %

C-2: Bismuth tris(isostearate) content 100 wt. %

C-3: K-KAT XK-628 King Industries Corp., bismuth carboxylate salts content 100 wt. %

C-4: K-KAT XK-640 King Industries Corp., bismuth carboxylate salts content 55 wt. %

C-5: K-KAT XC-227 King Industries Corp., bismuth complex content 87.5 Wt. %

C-6: Dibutyltin dilaurate content 100 wt. %

C-7: K-KAT XK-635 King Industries Corp., organozinc complex 100 wt. %

Component (D)

D-1: MKC Silicate MS56 Mitsubishi Chemical Corp.

D-2: MKC Silicate MS58B30 Mitsubishi Chemical Corp.

D-3: EMS-485 Colcoat Corp.

Component (E)

E-1: trimethyl orthoacetate

E-2: triethyl orthoformate

E-3: triethyl orthopropionate

Preparation of Test Pieces

Test pieces were prepared according to the following methods (1) to (3), by the 2 coat 2 bake, or 3 coat 3 bake methods.

(1) Undercoat Painting (1-1) Application of Epoxy Resin Undercoat Paint

The undercoat paint film was formed by applying an epoxy resin undercoat paint (brand name "Precolor Primer HP32", BASF Japan (Corp.)) onto 0.35 mm thick passivated aluminum/zinc alloy plated steel sheet (Al55%) with a bar coater to give a dry film thickness of 5 μm, and baking in a hot air dryer for 40 secs at a maximum attained sheet temperature of 210° C.

(1-2) Application of Polyester Urethane Undercoat Paint

An undercoat paint film was formed by applying a polyester urethane undercoat paint (brand name "Coiltec U HP 300", BASF Japan (Corp.)) onto the same material as in (1-1) with a bar coater to give a dry film thickness of 25 μm, and baking in a hot air dryer for 40 secs at a maximum attained sheet temperature of 230° C.

(2) Application of Midcoat

In practical examples 4-5, a midcoat paint film was formed by applying the thermosetting composition PA-22 as midcoat onto the undercoat painted sheet previously painted by the method of (1-2) with a bar coater to give a dry film thickness of 5 μm, and baking in a hot air dryer for 40 secs at a maximum attained sheet temperature of 230° C.

(3) Preparation of Topcoat Painted Sheet

The thermosetting compositions PA-1 to 42 were charged into test roller coater paint machines, and while continuously rotating the pickup roller and applicator roller under the conditions in Table 3, they were intermittently applied onto (1) the undercoat painted sheet or (2) the midcoat painted sheet under the 3 conditions directly after charging, 2 hours afterwards and 4 hours afterwards, and test pieces were obtained by forming the topcoat paint films by baking in a hot air dryer for 40 secs at a maximum attained sheet temperature of 230° C.

TABLE 3

| Roller coater paint machine operating conditions | | |
|---|---|---|
| Pickup roller peripheral speed (m/min) | Applicator roller peripheral speed (m/min) | Backing roller peripheral speed (m/min) |
| When idling  20 | 20 | — |
| When painting  50 | 80 | 65 |

The following paint film performance assessments were performed on the 3 topcoat painted sheets obtained in each practical example and comparative example, and the results are shown in Table 4. Also, it is preferable that not only the articles (painted sheets) painted directly afterwards, but also those painted 2 hours afterwards and 4 hours afterwards, show satisfactory performance.

(i) 60° specular gloss retention

The 60° specular gloss values of the sheets painted directly afterwards, 2 hours afterwards and 4 hours afterwards were measured, and the gloss retention of the sheets painted 2 hours afterwards and 4 hours afterwards was calculated by the following formula (Num. 1), and assessed by the following criteria.

Gloss retention (%)=(60° specular gloss value of target painted sheet)/(60° specular gloss value of sheet painted directly afterwards)×100    [Num. 1]

◉: 90% or more
○: 80% or more, less than 90%
X: less than 80%

(ii) Bending Workability (1)

At 20° C. room temperature, test pieces cut to width 5 cm were bent into a letter U around a cylindrical rod of diameter 10 mm such that the paint film surface was on the outside, then 6 painted sheets identical in thickness to the test piece were placed inside, and subjected to 180° bending with the paint film on the outside. For the assessment, the end parts were inspected with a 10× magnifying glass, and assessed by the following criteria.

◉: no cracking
○: less than 20% cracking
Δ: 20-50% cracking
X: more than 50% cracking (iii) Bending Workability (2)

At 20° C. room temperature, the test pieces were bent 180° by the same method as in (ii) Bending Workability (1), changing to placing 2 sheets inside. For the assessment, the bent end parts were then peeled with cellophane adhesive tape, and assessed by the following criteria.

◉: no peeling
○: less than 20% peeling
Δ: 20-50% peeling
X: more than 50% peeling (iv) Bending Workability (3)

At 20° C. room temperature, test pieces cut to width 5 cm, previously immersed in boiling water for 2 hrs, were bent 180° by the same method as in (ii) Bending workability (1), changing to placing 2 sheets inside. For the assessment, the bent end parts were then peeled with cellophane adhesive tape, and assessed by the following criteria.

◉: no peeling
○: less than 20% peeling
Δ: 20-50% peeling
X: more than 50% peeling (v) Hydrophilicity, Carbon Stain Resistance Each test piece was immersed in distilled water at room temperature for 12 hrs, then the following tests were performed.

(v-a) Hydrophilicity

The distilled water contact angle with 2 µl liquid drop volume was measured with a Kyowa Interface Science Corp. DM-501 type contact goniometer.

◉: contact angle=less than 40°
○: contact angle=40-50°
X: contact angle=more than 50°

(v-b) Carbon Stain Resistance

A mixture of distilled water:carbon black FW200 (Orion Engineered Carbons (Corp.))=90/10 (weight ratio) was applied onto the painted sheets then dried under the conditions 2 hours at 40° C., and then washed in one direction 30 times with a dish-washing sponge scourer under running water. The color difference (ΔE) before and after testing was measured, and assessed by the following criteria.

◉: ΔE=less than 2.0
○: ΔE=2.0-5.0
X: ΔE=more than 5.0

(vi) Rain Streak Stain Resistance

On a fixed house frontage-modelling platform at the BASF Japan (Corp.) Totsuka Works, test pieces (100 mm×200 mm×0.35 mm) were placed so that the paint surface faced northwards, an exposure test was performed, and test pieces exposed for 6 months were obtained. The condition of the paint surface of each test piece was observed visually, and assessed according to the following criteria:

◉: no rain streak tracks observed
○: rain streak tracks observed to a slight extent
X: rain streak tracks observed.

TABLE 4

1. Table 4A

| | | | 2. examples | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| 3. Undercoat | type | | HP32 | HP300 | HP300 | HP300 | HP300 | HP32 | HP32 | HP32 | HP300 | HP300 | HP32 | HP32 | HP32 | HP300 |
| | thickness (μm) | i | 5 | 25 | 25 | 25 | 25 | 5 | 5 | 5 | 25 | 25 | 5 | 5 | 5 | 25 |
| 4. Midcoat | type | ii | | | | PA-22 | PA-22 | | | | | | | | | |
| | thickness (μm) | ii | | | | 5 | 5 | | | | | | | | | |
| 5. Topcoat | type | i | PA-1 | PA-1 | PA-2 | PA-1 | PA-2 | PA-3 | PA-4 | PA-5 | PA-10 | PA-11 | PA-12 | PA-13 | PA-18 | PA-19 |
| | thickness (μm) | ii | 20 | 20 | 20 | 20 | 20 | 20 | 20 | 20 | 20 | 20 | 20 | 20 | 20 | 20 |
| 6. paint film performance | | | | | | | | | | | | | | | | |
| 7. b-g directly afterwards | bending workability (1) | | ○ | ◎ | ○ | ◎ | ○ | ◎ | ◎ | ○ | ◎ | ○ | ○ | ◎ | ○ | ○ |
| | bending workability (2) | | ◎ | ◎ | ◎ | ◎ | ◎ | ◎ | ◎ | ◎ | ◎ | ◎ | ◎ | ○ | ◎ | ◎ |
| | bending workability (3) | | ◎ | ◎ | ◎ | ◎ | ◎ | ◎ | ◎ | ◎ | ◎ | ◎ | ◎ | ◎ | ◎ | ◎ |
| | hydrophilicity | | ◎ | ◎ | ◎ | ◎ | ◎ | ◎ | ◎ | ○ | ◎ | ◎ | ◎ | ◎ | ◎ | ◎ |
| | carbon staining | | ◎ | ◎ | ◎ | ◎ | ◎ | ◎ | ◎ | ○ | ◎ | ◎ | ◎ | ◎ | ◎ | ◎ |
| | rain streak | | ◎ | ◎ | ◎ | ◎ | ◎ | ◎ | ◎ | ◎ | ◎ | ◎ | ◎ | ◎ | ◎ | ◎ |
| | stain resistance | | ◎ | ◎ | ◎ | ◎ | ◎ | ◎ | ◎ | ◎ | ◎ | ◎ | ◎ | ◎ | ◎ | ◎ |
| 8. a-g 2 hrs afterwards | % gloss retention | | ◎ | ◎ | ◎ | ◎ | ◎ | ◎ | ◎ | ◎ | ◎ | ◎ | ◎ | ◎ | ◎ | ◎ |
| | bending workability (1) | | ○ | ◎ | ○ | ◎ | ○ | ◎ | ◎ | ○ | ◎ | ○ | ○ | ◎ | ○ | ○ |
| | bending workability (2) | | ◎ | ◎ | ◎ | ◎ | ◎ | ◎ | ◎ | ◎ | ◎ | ◎ | ◎ | ◎ | ◎ | ◎ |
| | bending workability (3) | | ◎ | ◎ | ◎ | ◎ | ◎ | ◎ | ◎ | ◎ | ◎ | ◎ | ◎ | ◎ | ◎ | ◎ |
| | hydrophilicity | | ◎ | ◎ | ◎ | ◎ | ◎ | ◎ | ◎ | ○ | ◎ | ◎ | ◎ | ◎ | ◎ | ◎ |
| | carbon staining | | ◎ | ◎ | ◎ | ◎ | ◎ | ◎ | ◎ | ○ | ◎ | ◎ | ◎ | ◎ | ◎ | ◎ |
| | rain streak | | ◎ | ◎ | ◎ | ◎ | ◎ | ◎ | ◎ | ◎ | ◎ | ◎ | ◎ | ◎ | ◎ | ◎ |
| | stain resistance | | ◎ | ◎ | ◎ | ◎ | ◎ | ◎ | ◎ | ◎ | ◎ | ◎ | ◎ | ◎ | ◎ | ◎ |
| 9. a-g 4 hrs afterwards | % gloss retention | | ◎ | ◎ | ◎ | ◎ | ◎ | ◎ | ◎ | ◎ | ◎ | ◎ | ◎ | ◎ | ◎ | ○ |
| | bending workability (1) | | ○ | ◎ | ○ | ◎ | ○ | ◎ | ◎ | ○ | ◎ | ○ | ◎ | ○ | ○ | ◎ |
| | bending workability (2) | | ◎ | ◎ | ◎ | ◎ | ◎ | ◎ | ◎ | ◎ | ◎ | ◎ | ○ | ◎ | ◎ | ◎ |
| | bending workability (3) | | ◎ | ◎ | ◎ | ◎ | ◎ | ◎ | ◎ | ◎ | ◎ | ◎ | ◎ | ◎ | ◎ | ◎ |
| | hydrophilicity | | ◎ | ◎ | ◎ | ◎ | ◎ | ◎ | ◎ | ○ | ◎ | ◎ | ◎ | ◎ | ◎ | ◎ |
| | carbon staining | | ◎ | ◎ | ◎ | ◎ | ◎ | ◎ | ◎ | ○ | ◎ | ◎ | ◎ | ◎ | ◎ | ○ |
| | rain streak | | ◎ | ◎ | ◎ | ◎ | ◎ | ◎ | ◎ | ◎ | ◎ | ◎ | ◎ | ◎ | ◎ | ◎ |
| | stain resistance | | ◎ | ◎ | ◎ | ◎ | ◎ | ◎ | ◎ | ◎ | ◎ | ◎ | ◎ | ◎ | ◎ | ◎ |

TABLE 4-continued

1. Table 4B

| | | 2. Practical example | | | | | | | | | | | | | | | |
|---|---|---|---|---|---|---|---|---|---|---|---|---|---|---|---|---|---|
| | | 15 | 16 | 17 | 18 | 19 | 20 | 21 | 22 | 23 | 24 | 25 | 26 | 27 | 28 | 29 | 30 |
| 3. Undercoat | type i | HP300 | HP300 | HP300 | HP32 | HP32 | HP300 | HP300 | HP32 | HP32 | HP300 | HP300 | HP32 | HP32 | HP32 | HP300 | HP300 |
| | thickness (μm) ii | 25 | 25 | 25 | 5 | 5 | 25 | 25 | 5 | 5 | 25 | 25 | 5 | 5 | 5 | 25 | 25 |
| 4. Topcoat | type i | PA-20 | PA-21 | PA-25 | PA-26 | PA-27 | PA-28 | PA-29 | PA-30 | PA-31 | PA-32 | PA-33 | PA-34 | PA-37 | PA-38 | PA-39 | PA-40 |
| | thickness (μm) ii | 20 | 20 | 20 | 20 | 20 | 20 | 20 | 20 | 20 | 20 | 20 | 20 | 20 | 20 | 20 | 20 |
| 5. paint film performance | | | | | | | | | | | | | | | | | |
| 6. b-g directly afterwards | bending workability (1) | ◎ | ○ | ○ | ◎ | ○ | ◎ | ○ | ◎ | ○ | ○ | ○ | ◎ | ◎ | ◎ | ○ | ○ |
| | bending workability (2) | ◎ | ○ | ◎ | ◎ | ◎ | ◎ | ◎ | ◎ | ○ | ◎ | ◎ | ◎ | ◎ | ◎ | ◎ | ◎ |
| | bending workability (3) | ◎ | ◎ | ◎ | ◎ | ◎ | ◎ | ◎ | ◎ | ○ | ◎ | ◎ | ○ | ○ | ◎ | ◎ | ◎ |
| | hydrophilicity | ◎ | ◎ | ◎ | ◎ | ◎ | ◎ | ◎ | ◎ | ◎ | ◎ | ◎ | ◎ | ◎ | ◎ | ◎ | ◎ |
| | carbon staining | ◎ | ○ | ◎ | ◎ | ◎ | ◎ | ◎ | ◎ | ○ | ◎ | ◎ | ◎ | ◎ | ◎ | ◎ | ◎ |
| | rain streak | ◎ | ◎ | ○ | ◎ | ◎ | ◎ | ◎ | ◎ | ○ | ◎ | ◎ | ○ | ○ | ◎ | ○ | ◎ |
| | stain resistance | ◎ | ◎ | ◎ | ◎ | ◎ | ◎ | ◎ | ◎ | ◎ | ◎ | ◎ | ◎ | ◎ | ◎ | ◎ | ◎ |
| 7. a-g 2 hrs afterwards | % gloss retention | ◎ | ◎ | X | X | ○ | ◎ | ◎ | ◎ | ◎ | ◎ | ◎ | ◎ | ◎ | ◎ | ◎ | ◎ |
| | bending workability (1) | ◎ | ○ | ○ | ◎ | ○ | ◎ | ○ | ◎ | ○ | ○ | ○ | ◎ | ◎ | ◎ | ○ | ○ |
| | bending workability (2) | ◎ | ◎ | ◎ | ◎ | ◎ | ◎ | ◎ | ◎ | ◎ | ◎ | ◎ | ◎ | ◎ | ◎ | ◎ | ◎ |
| | bending workability (3) | ◎ | ◎ | ◎ | ○ | ◎ | ◎ | ◎ | ◎ | ◎ | ◎ | ◎ | ○ | ○ | ◎ | ◎ | ◎ |
| | hydrophilicity | ◎ | ◎ | ◎ | ◎ | ◎ | ◎ | ◎ | ◎ | ◎ | ◎ | ◎ | ◎ | ◎ | ◎ | ◎ | ◎ |
| | carbon staining | ◎ | ○ | ◎ | ◎ | ◎ | ◎ | ◎ | ◎ | ◎ | ◎ | ◎ | ◎ | ◎ | ◎ | ○ | ◎ |
| | rain streak | ◎ | ◎ | ◎ | ◎ | ◎ | ◎ | ◎ | ◎ | ◎ | ◎ | ◎ | ○ | ○ | ◎ | ○ | ◎ |
| | stain resistance | ◎ | ◎ | ◎ | ◎ | ◎ | ◎ | ◎ | ◎ | ◎ | ◎ | ◎ | ◎ | ◎ | ◎ | ◎ | ◎ |
| 8. a-g 4 hrs afterwards | % gloss retention | ◎ | ◎ | ◎ | ◎ | ◎ | ◎ | ◎ | ◎ | ◎ | ◎ | ◎ | ◎ | ◎ | ◎ | ◎ | ◎ |
| | bending workability (1) | ◎ | ○ | ○ | ◎ | ○ | ◎ | ○ | ◎ | ○ | ○ | ○ | ◎ | ◎ | ◎ | ○ | ○ |
| | bending workability (2) | ◎ | ◎ | ◎ | ◎ | ◎ | ◎ | ◎ | ◎ | ◎ | ◎ | ◎ | ◎ | ◎ | ◎ | ◎ | ◎ |
| | bending workability (3) | ◎ | ◎ | ◎ | ○ | ◎ | ◎ | ◎ | ◎ | ◎ | ◎ | ◎ | ○ | ○ | ◎ | ◎ | ◎ |
| | hydrophilicity | ◎ | ◎ | ◎ | ◎ | ◎ | ◎ | ◎ | ◎ | ◎ | ◎ | ◎ | ◎ | ◎ | ◎ | ◎ | ◎ |
| | carbon staining | ◎ | ○ | ◎ | ◎ | ◎ | ◎ | ◎ | ◎ | ◎ | ◎ | ◎ | ◎ | ◎ | ◎ | ○ | ◎ |
| | rain streak | ◎ | ○ | ○ | ◎ | ◎ | ◎ | ◎ | ◎ | ◎ | ◎ | ◎ | ○ | ○ | ◎ | ○ | ◎ |
| | stain resistance | ◎ | ◎ | ◎ | ◎ | ◎ | ◎ | ◎ | ◎ | ◎ | ◎ | ◎ | ◎ | ◎ | ◎ | ◎ | ◎ |

TABLE 4-continued

Table 4C

| | | | 2. Comparative example | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| 3. undercoat | type | i | HP32 | HP300 | HP32 | HP300 | HP300 | HP300 | HP32 | HP32 | HP32 | HP300 | HP300 | HP300 | HP300 | HP32 | HP300 |
| | thickness (μm) | ii | 5 | 25 | 5 | 25 | 25 | 25 | 5 | 5 | 5 | 25 | 25 | 25 | 25 | 5 | 25 |
| 4. topcoat | type | i | PA-6 | PA-7 | PA-8 | PA-9 | PA-14 | PA-15 | PA-16 | PA-17 | PA-22 | PA-23 | PA-24 | PA-35 | PA-36 | PA-41 | PA-42 |
| | thickness (μm) | ii | 20 | 20 | 20 | 20 | 20 | 20 | 20 | 20 | 20 | 20 | 20 | 20 | 20 | 20 | 20 |
| 5. paint film performance | | | | | | | | | | | | | | | | | |
| 6. b-g directly afterwards | bending workability (1) | | ◎ | X | ◎ | ○ | ○ | ◎ | ○ | ○ | ◎ | ◎ | X | △ | ◎ | ◎ | △ |
| | bending workability (2) | | ◎ | X | ◎ | ◎ | ◎ | ◎ | ◎ | ◎ | ◎ | ◎ | X | △ | ◎ | ◎ | △ |
| | bending workability (3) | | X | X | ◎ | ◎ | △ | ◎ | ◎ | ◎ | ◎ | ◎ | ◎ | X | △ | △ | X |
| | hydrophilicity | | ◎ | ◎ | ◎ | ◎ | ◎ | ◎ | ◎ | ◎ | X | ○ | ◎ | ◎ | ◎ | ◎ | ◎ |
| | carbon staining | | ○ | ○ | ◎ | ◎ | X | ◎ | ◎ | ◎ | X | ○ | ◎ | ◎ | X | X | ◎ |
| | rain streak | | ○ | ◎ | ◎ | ◎ | ○ | ◎ | ◎ | ◎ | X | ○ | ◎ | ◎ | X | X | ◎ |
| | stain resistance | | | | | | | | | | | | | | | | |
| 7. a-g 2 hrs afterwards | % gloss retention | | | | | | | | | | | | | | | | |
| | bending workability (1) | | ◎ | ◎ | ◎ | ○ | ○ | ◎ | X | ○ | ◎ | ◎ | X | ◎ | ◎ | ◎ | ◎ |
| | bending workability (2) | | ◎ | X | ◎ | ◎ | ◎ | ◎ | ◎ | ◎ | ◎ | ◎ | X | △ | ◎ | △ | △ |
| | bending workability (3) | | X | X | ◎ | ◎ | △ | ◎ | ◎ | ◎ | ◎ | ◎ | ◎ | X | △ | ◎ | X |
| | hydrophilicity | | ◎ | ◎ | ◎ | X | ◎ | X | X | ◎ | X | X | ◎ | ◎ | ◎ | X | ◎ |
| | carbon staining | | X | X | X | X | X | X | X | X | X | X | X | X | X | X | ◎ |
| | rain streak | | X | ○ | X | X | X | X | X | X | X | X | ◎ | X | X | X | ◎ |
| | stain resistance | | | | | | | | | | | | | | | | |
| 8. a-g 4 hrs afterwards | % gloss retention | | | | | | | | | | | | | | | | |
| | bending workability (1) | | ◎ | ◎ | ◎ | ○ | ◎ | X | X | X | ◎ | X | ◎ | ◎ | ◎ | ◎ | ◎ |
| | bending workability (2) | | ◎ | X | ◎ | ◎ | ◎ | ◎ | ◎ | ◎ | ◎ | ◎ | X | △ | ◎ | ◎ | △ |
| | bending workability (3) | | X | X | ◎ | ◎ | △ | ◎ | ◎ | ◎ | ◎ | ◎ | X | X | △ | △ | X |
| | hydrophilicity | | ◎ | ◎ | ◎ | X | ◎ | X | X | ◎ | X | X | ◎ | ◎ | ◎ | X | ◎ |
| | carbon staining | | X | X | X | X | X | X | X | X | X | X | ◎ | ◎ | X | X | ◎ |
| | rain streak | | X | ○ | X | X | X | X | X | X | X | X | ◎ | ◎ | X | X | ◎ |
| | stain resistance | | | | | | | | | | | | | | | | |

The invention claimed is:

1. A thermosetting composition comprising
(A) a polyester resin of number average molecular weight 1,000-10,000, hydroxyl value 5-200 mg KOH/g, wherein the polyester resin is the reaction product of
from 22.5 to 24.5 parts by weight of solids of isophthalic acid,
from 14.8 to 18.8 parts by weight of solids of phthalic anhydride,
from 16.5 to 19.3 parts by weight of solids of adipic acid,
from 10.2 to 34.1 parts by weight of solids of neopentyl glycol,
from 4.4 to 8.5 parts by weight of solids of 1,6-hexanediol, and
from 0.5 to 31.5 parts by weight of solids of trimethylolpropane;
(B) a compound (B) which is hexamethylenediisocyanate or isophorone diisocyanate each of which has NCO groups blocked with methyl ethyl ketoxime and/or ε-caprolactam, wherein the amount of the compound (B) is an amount that provides 0.5-2.0 molar equivalents of blocked NCO relative to the hydroxyl groups of the polyester resin (A);
(C) 0.5-3.0 parts by weight of a bismuth compound, per 100 parts by weight of total resin solids of component (A) and component (B), wherein the bismuth compound is bismuth tris(2-ethylhexanoate) or bismuth tris(isostearate) or bismuth carboxylate;
(D) 1.0-20 parts by weight of an organosilicate represented by the following general formula (I) and/or a condensation product thereof, relative to 100 parts by weight of total resin solids of component (A) and component (B),

wherein $R^1$, $R^2$, $R^3$ and $R^4$ independently represent hydrogen, methyl or ethyl, and n is 1; and
(E) 0.5-50 parts by weight, per 100 parts by weight of total resin solids of component (A) and component (B), of a compound (E) selected from trimethyl orthoacetate, triethyl orthoformate and triethyl orthopropionate.

2. A method for paint finishing of a metal sheet, the method comprising applying the thermosetting composition as claimed in claim 1 onto a metal sheet, and thermally curing the thermosetting composition.

3. The method for paint finishing as claimed in claim 2, wherein the thermosetting composition is applied with a roller coater.

4. The method for paint finishing as claimed in claim 3, wherein the aforesaid metal sheet is any of: a cold rolled steel sheet, a galvanized steel sheet, an aluminum-zinc plated steel sheet, a zinc-magnesium-plated steel sheet, an aluminum-zinc-magnesium-plated steel sheet, a stainless steel sheet, an aluminum sheet and an aluminum alloy sheet.

5. The method for paint finishing as claimed in claim 2, wherein the aforesaid metal sheet is any of: a cold rolled steel sheet, a galvanized steel sheet, an aluminum-zinc plated steel sheet, a zinc-magnesium-plated steel sheet, an aluminum-zinc-magnesium-plated steel sheet, a stainless steel sheet, an aluminum sheet and an aluminum alloy sheet.

6. A method for paint finishing of a metal sheet, the method comprising applying an undercoat paint onto the metal sheet and thermally curing the undercoat paint to form an undercoat layer, optionally applying a midcoat paint on top of the undercoat layer and thermally curing the midcoat paint to form a midcoat layer, and applying the thermosetting composition as claimed in claim 1 on top of the paint layer(s) as a topcoat paint and thermally curing the thermosetting composition.

7. The method for paint finishing as claimed in claim 6, wherein the thermosetting composition is applied with a roller coater.

8. The method for paint finishing as claimed in claim 6, wherein the aforesaid metal sheet is any of: a cold rolled steel sheet, a galvanized steel sheet, an aluminum-zinc plated steel sheet, a zinc-magnesium-plated steel sheet, an aluminum-zinc-magnesium-plated steel sheet, a stainless steel sheet, an aluminum sheet and an aluminum alloy sheet.

9. A method for the production of a painted article, the method comprising applying the thermosetting composition as claimed in claim 1 onto an outer metal sheet of an article, and thermally curing the thermosetting composition.

10. The method for the production of a painted article as claimed in claim 9, wherein the thermosetting composition is applied with a roller coater.

11. The method for the production of a painted article as claimed in claim 9, wherein the aforesaid outer metal sheet is any of: a cold rolled steel sheet, a galvanized steel sheet, an aluminum-zinc plated steel sheet, a zinc-magnesium-plated steel sheet, an aluminum-zinc-magnesium-plated steel sheet, a stainless steel sheet, an aluminum sheet and an aluminum alloy sheet.

12. A method for the production of a painted article, the method comprising applying an undercoat paint onto an outer metal sheet of an article and thermally curing the undercoat paint to form an undercoat layer, optionally applying a midcoat paint on top of the undercoat layer and thermally curing the midcoat paint to form a midcoat layer, and applying the thermosetting composition as claimed in claim 1 on top of the paint layer(s) as a topcoat paint and thermally curing the thermosetting composition.

13. A painted article produced by the method of claim 9.
14. A painted article produced by the method of claim 10.
15. A painted article produced by the method of claim 11.
16. A painted article produced by the method of claim 12.

* * * * *